(12) United States Patent
Maeda

(10) Patent No.: US 11,499,759 B2
(45) Date of Patent: *Nov. 15, 2022

(54) AIR-CONDITIONING DEVICE

(71) Applicant: Marelli Corporation, Saitama (JP)

(72) Inventor: Tomohiro Maeda, Saitama (JP)

(73) Assignee: Marelli Cabin Comfort Japan Corporation, Saitama (JP)

( * ) Notice: Subject to any disclaimer, the term of this patent is extended or adjusted under 35 U.S.C. 154(b) by 129 days.

This patent is subject to a terminal disclaimer.

(21) Appl. No.: 16/978,986

(22) PCT Filed: Mar. 1, 2019

(86) PCT No.: PCT/JP2019/008173
§ 371 (c)(1),
(2) Date: Sep. 8, 2020

(87) PCT Pub. No.: WO2019/172135
PCT Pub. Date: Sep. 12, 2019

(65) Prior Publication Data
US 2021/0023911 A1 Jan. 28, 2021

(30) Foreign Application Priority Data

Mar. 9, 2018 (JP) .............................. JP2018-043560

(51) Int. Cl.
*F25B 5/04* (2006.01)
*F25B 41/20* (2021.01)
(Continued)

(52) U.S. Cl.
CPC .................. *F25B 5/04* (2013.01); *B60H 1/22* (2013.01); *F25B 41/20* (2021.01); *F25B 41/39* (2021.01);
(Continued)

(58) Field of Classification Search
CPC ............ B60H 1/22; B60H 2001/00957; B60H 1/3229; B60H 2001/00928;
(Continued)

(56) References Cited

U.S. PATENT DOCUMENTS 5,526,650 A * 6/1996 Iritani ..................... F24F 3/153
62/90
6,035,653 A * 3/2000 Itoh ....................... B60H 1/3207
62/224
(Continued)

FOREIGN PATENT DOCUMENTS

JP 2013-535372 A 9/2013
JP 2014-94671 A 5/2014
(Continued)

*Primary Examiner* — Kun Kai Ma
(74) *Attorney, Agent, or Firm* — Young Basile Hanlon & MacFarlane, P.C.

(57) ABSTRACT

An air-conditioning device includes a heater unit that heats the air to be lead to a vehicle cabin using the heat of the refrigerant compressed by a compressor, a liquid receiver arranged at the downstream side of an outside heat exchanger, a liquid receiver separating the refrigerant lead from the outside heat exchanger into a liquid-phase refrigerant and a gaseous-phase refrigerant and storing the liquid-phase refrigerant, and a restrictor mechanism provided between the heater unit and the outside heat exchanger, the restrictor mechanism decompressing and expanding the refrigerant. When there is a dehumidification request, the operation mode is temporarily switched from a dehumidifying cabin-heating mode which evaporates the refrigerant by an evaporating unit and radiates heat by the heater unit in the state in which the restrictor mechanism restricts the flow of the refrigerant, to the cabin-cooling mode which evaporates the refrigerant by the evaporating unit while promoting the storage of the liquid-phase refrigerant in the liquid receiver.

12 Claims, 11 Drawing Sheets

(51) Int. Cl.
  *B60H 1/22* (2006.01)
  *F25B 41/39* (2021.01)
  *B60H 1/00* (2006.01)
  *F25B 49/02* (2006.01)

(52) U.S. Cl.
  CPC .... *B60H 2001/00957* (2013.01); *F25B 49/02* (2013.01); *F25B 2400/0409* (2013.01); *F25B 2400/0411* (2013.01)

(58) Field of Classification Search
  CPC . B60H 1/00921; B60H 1/32281; F25B 41/20; F25B 49/02; F25B 2400/0409; F25B 2400/0411; F25B 39/02; F25B 2339/047; F25B 2600/2513; F25B 2341/0683; F25B 2400/23; F25B 2600/2501
  See application file for complete search history.

(56) References Cited

U.S. PATENT DOCUMENTS

| | | | | |
|---|---|---|---|---|
| 6,047,770 | A * | 4/2000 | Suzuki | B60H 1/3204 62/526 |
| 6,237,351 | B1 * | 5/2001 | Itoh | F25B 5/00 62/196.3 |
| 6,293,123 | B1 * | 9/2001 | Iritani | B60H 1/3205 62/409 |
| 2008/0041071 | A1 * | 2/2008 | Itoh | F25B 9/008 62/79 |
| 2009/0241573 | A1 * | 10/2009 | Ikegami | F25B 13/00 62/238.7 |
| 2011/0048671 | A1 * | 3/2011 | Nishikawa | B60H 1/3213 165/42 |
| 2013/0186131 | A1 | 7/2013 | Guitar | |
| 2014/0298837 | A1 * | 10/2014 | Tanda | F25B 41/24 62/150 |
| 2015/0253045 | A1 | 9/2015 | Yamada et al. | |
| 2015/0283872 | A1 | 10/2015 | Miyakoshi et al. | |
| 2016/0068047 | A1 | 3/2016 | Kobayashi et al. | |
| 2016/0257179 | A1 * | 9/2016 | Miyakoshi | B60H 1/00921 |
| 2016/0288618 | A1 * | 10/2016 | Katoh | B60H 1/00921 |
| 2016/0297283 | A1 * | 10/2016 | Sakamoto | F25B 47/02 |
| 2017/0267063 | A1 * | 9/2017 | Shan | F25B 5/02 |
| 2019/0030992 | A1 * | 1/2019 | Tada | F25B 30/02 |
| 2019/0070929 | A1 * | 3/2019 | Nakamura | B60H 1/32 |
| 2019/0111756 | A1 * | 4/2019 | Makimoto | B60H 1/32281 |
| 2019/0128575 | A1 * | 5/2019 | Sugimura | F25B 43/00 |
| 2019/0184790 | A1 * | 6/2019 | Miura | B60H 1/00878 |
| 2020/0139786 | A1 * | 5/2020 | Nakamura | B60H 1/00 |
| 2020/0207178 | A1 * | 7/2020 | Makimoto | F25B 1/00 |
| 2020/0254846 | A1 * | 8/2020 | Hatakeyama | B60H 1/00 |
| 2020/0292218 | A1 * | 9/2020 | Kawazoe | F25B 45/00 |
| 2020/0298665 | A1 * | 9/2020 | Nakazawa | B60H 1/08 |
| 2020/0398645 | A1 * | 12/2020 | He | F25B 41/26 |
| 2021/0023911 | A1 * | 1/2021 | Maeda | F25B 6/04 |
| 2021/0088246 | A1 * | 3/2021 | Kami | F24F 11/89 |
| 2021/0190389 | A1 * | 6/2021 | Tada | F25B 41/20 |

FOREIGN PATENT DOCUMENTS

| | | |
|---|---|---|
| JP | 2014-211265 A | 11/2014 |
| JP | 2017-171284 A | 9/2017 |
| WO | 2014/057607 A1 | 4/2014 |

* cited by examiner

AIR-CONDITIONING DEVICE

CROSS-REFERENCE TO RELATED APPLICATION(S)

This application claims priority to Japanese Application Patent Serial No. 2018-043560, filed Mar. 9, 2018, the entire disclosure of which is hereby incorporated by reference.

TECHNICAL FIELD

The present invention relates to an air-conditioning device.

BACKGROUND

JP2013-535372A discloses an air-conditioning device capable of switching a cabin-cooling operation and a cabin-heating operation by switching a flow of refrigerant in a refrigeration cycle. In this air-conditioning device, the cabin-cooling operation is operated by switching the refrigeration cycle to a cabin-cooling mode, and the cabin-heating operation is operated by switching the refrigeration cycle to a heat pump cabin-heating mode.

SUMMARY

However, in the air-conditioning device disclosed in JP2013-535372A, in order to perform a dehumidification, it is necessary to switch the refrigeration cycle to the cabin-cooling mode.

An object of the present invention is to provide an air-conditioning device capable of executing a dehumidifying cabin-heating operation in which a dehumidification is performed while maintaining a cabin-heating state.

According to an aspect of the present invention, an air-conditioning device mounted on a vehicle includes a compressor configured to compress a refrigerant, an outside heat exchanger configured to perform heat exchange between the refrigerant and outside air, an evaporating unit configured to evaporate the refrigerant by causing the refrigerant to absorb heat of air to be led to a vehicle cabin of the vehicle, a heater unit configured to heat the air to be led to the vehicle cabin using heat of the refrigerant compressed by the compressor, a liquid receiver arranged at a downstream side of the outside heat exchanger, the liquid receiver being configured to separate the refrigerant led from the outside heat exchanger into a liquid-phase refrigerant and a gaseous-phase refrigerant and to store the liquid-phase refrigerant, a restrictor mechanism provided between the heater unit and the outside heat exchanger, the restrictor mechanism being configured to decompress and expand the refrigerant, and an expansion valve provided between the outside heat exchanger and the evaporating unit, the expansion valve being configured to decompress and expand the refrigerant that has passed through the outside heat exchanger. When there is a dehumidification request, an operation mode is temporarily switched from a first operation mode which evaporates the refrigerant by the evaporating unit and radiates heat by the heater unit in a state in which the restrictor mechanism restricts a flow of the refrigerant, to a second operation mode which evaporates the refrigerant by the evaporating unit while promoting a storage of the liquid-phase refrigerant in the liquid receiver.

In the above aspect, when there is the dehumidification request, the operation mode is temporarily switched from the first operation mode to the second operation mode. In the first operation mode, while executing the cabin-heating operation, the liquid-phase refrigerant stored in the liquid receiver is led to the evaporating unit. In the second operation mode, storing the liquid-phase refrigerant, which is a part of the refrigerant led from the outside heat exchanger, in the liquid receiver is promoted. Therefore, the liquid-phase refrigerant can be stored in the liquid receiver by temporarily switching to the second operation mode. In the first operation mode, it is possible to perform dehumidification using the liquid-phase refrigerant in the liquid receiver while executing the cabin-heating operation. Therefore, it is possible to stably execute the dehumidifying cabin-heating operation in which the dehumidification is performed while maintaining the cabin-heating state.

DETAILED DESCRIPTION

Embodiments of the present invention will be described below with reference to the drawings.

First Embodiment

An air-conditioning device 100 according to a first embodiment of the present invention will be described below with reference to FIGS. 1 to 8.

A configuration of the air-conditioning device 100 will be described first with reference to FIGS. 1 to 3.

Figure 1:
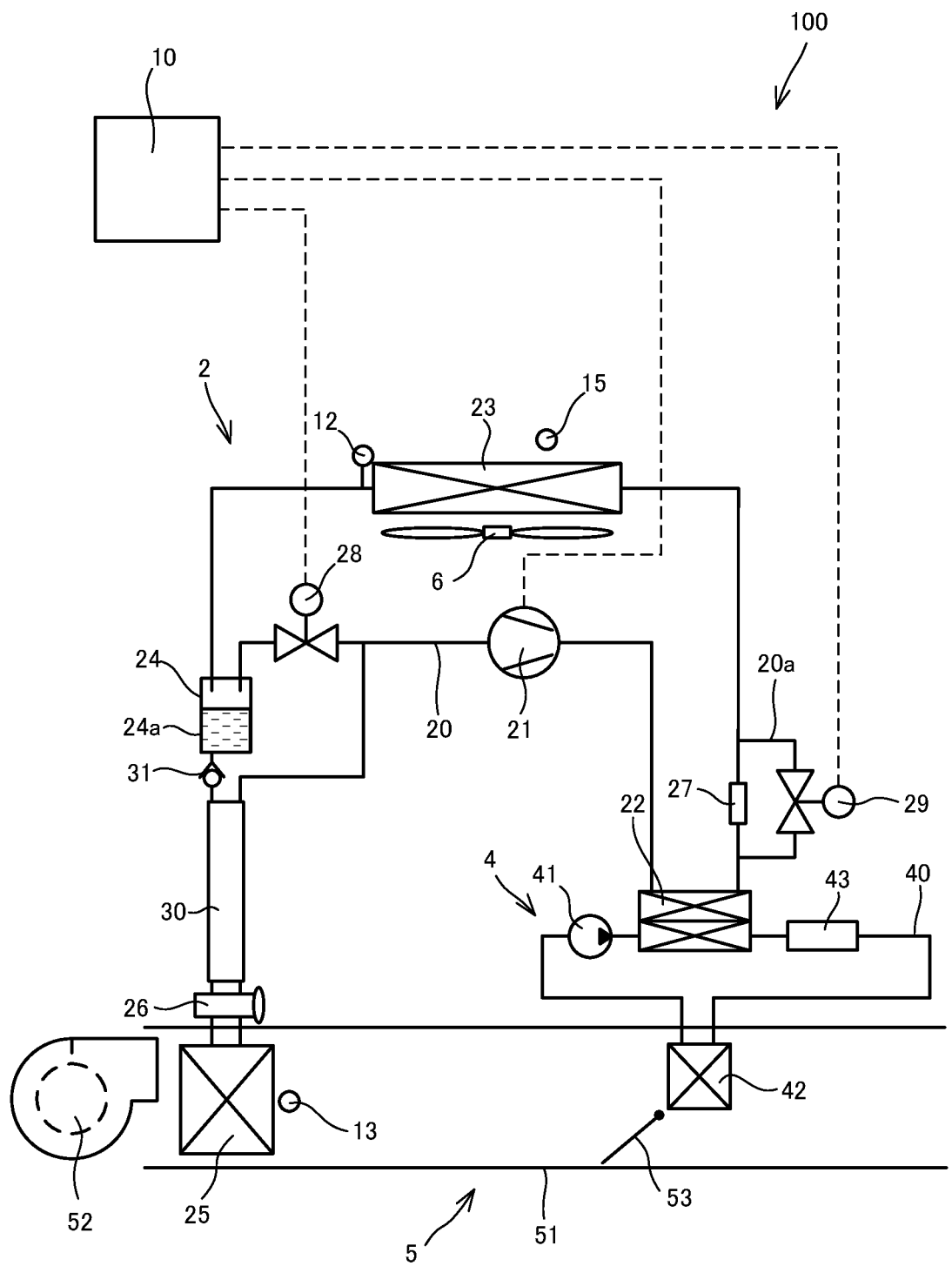
FIG. 1 is a configuration diagram of an air-conditioning device according to a first embodiment of the present invention.

As shown in FIG. 1, the air-conditioning device 100 is provided with a refrigeration cycle 2 through which a refrigerant circulates, a hot-water cycle 4 through which hot water circulates, an HVAC (Heating Ventilation and Air Conditioning) unit 5 through which air used for air-conditioning passes, and a controller 10 serving as a control unit that controls operation of the air-conditioning device 100.

The air-conditioning device 100 is a heat pump system capable of performing cabin cooling and cabin heating. The air-conditioning device 100 is mounted on a vehicle (not shown) and performs air-conditioning in a vehicle cabin (not shown). For example, HFO-1234yf is used as the refrigerant, and an antifreeze is used as the hot water.

The refrigeration cycle 2 is provided with a compressor 21 serving as a compressor, a fluid-cooled condenser 22 serving as a hot-water-refrigerant heat exchanger, an outside heat exchanger 23, a liquid receiver 24, an internal heat exchanger 30, an evaporator 25 serving as an evaporating unit, a thermostatic expansion valve 26 serving as an expansion valve, a fixed restrictor 27 serving as a restrictor mechanism, a bypass channel 20a that allows flow of the refrigerant bypassing the fixed restrictor 27, a second flow path switching valve 29 serving as a flow path switching valve that opens/closes the bypass channel 20a, and a refrigerant flow path 20 that connects these components such that the refrigerant can circulates therethrough. The refrigerant flow path 20 is provided with a first flow path switching valve 28.

The compressor 21 sucks and compresses gaseous-state (gaseous-phase) refrigerant. Thus, the temperature and the pressure of the gaseous-state refrigerant become high.

The fluid-cooled condenser 22 functions as, at the time of a cabin-heating operation, a condenser with which the refrigerant that has passed through the compressor 21 is condensed. The fluid-cooled condenser 22 performs heat exchange between the refrigerant the temperature and the pressure of which are made high by the compressor 21 and the hot water circulating through the hot-water cycle 4, thereby transferring the heat of the refrigerant to the hot water. The refrigerant that has been condensed in the fluid-cooled condenser 22 flows to the fixed restrictor 27.

The fluid-cooled condenser 22 uses the heat of the refrigerant that has been compressed by the compressor 21 to heat air that is to be led into the vehicle cabin and used for the air-conditioning via the hot water circulating through the hot-water cycle 4. In this configuration, the fluid-cooled condenser 22 and the hot-water cycle 4 correspond to a heater unit for heating the air to be led into the vehicle cabin. Instead of this configuration, as shown in FIG. 2, it may be configured such that the refrigerant that has been compressed by the compressor 21 is led to a heater core 42 directly without providing the hot-water cycle 4. In this case, the heater core 42 corresponds to the heater unit.

The outside heat exchanger 23 is arranged in an engine compartment of the vehicle (in a motor compartment in a case of an electric car), for example, and performs the heat exchange between the refrigerant and outside air. The outside heat exchanger 23 functions as the condenser at the time of a cabin-cooling operation and functions as an evaporating unit at the time of the cabin-heating operation. The outside air is introduced into the outside heat exchanger 23 as the vehicle travels or as an outside fan 6 rotates.

Figure 3:
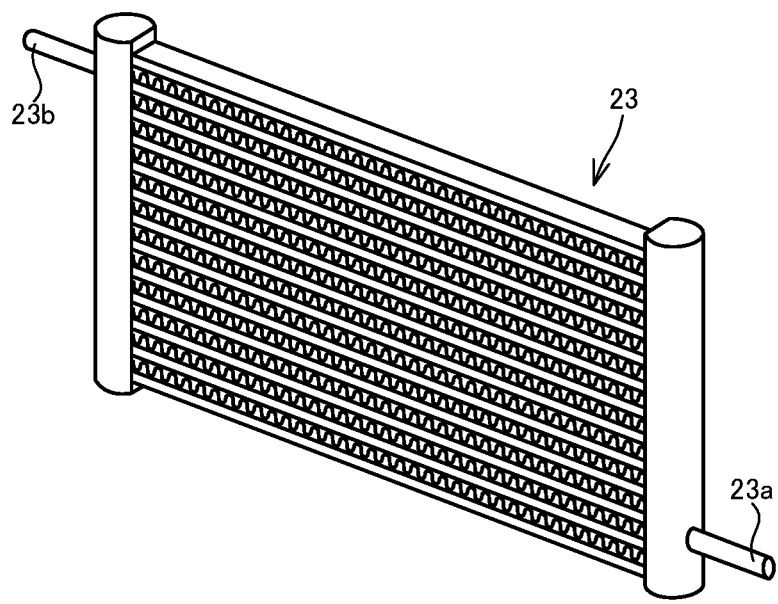
FIG. 3 is a perspective view of an outside heat exchanger.

As shown in FIG. 3, the outside heat exchanger 23 has a refrigerant inlet 23a into which the refrigerant is led and a refrigerant outlet 23b provided at a position higher than the refrigerant inlet 23a and from which the refrigerant is led out. In other words, in the outside heat exchanger 23, the refrigerant is led into the outside heat exchanger 23 from a lower level, ascends upwards in the interior thereof, and is led out from a higher level. With such a configuration, at the time of the cabin-heating operation, when the heat exchange between the outside air and the refrigerant is performed in the outside heat exchanger 23, the refrigerant, which has not been evaporated (the refrigerant with high humidity), in the outside heat exchanger 23 is less likely to be led out therefrom, and thus an amount of heat absorbed from the outside air is increased.

The liquid receiver 24 is disposed on the downstream side of the outside heat exchanger 23 so as to allow the refrigerant to be led from the outside heat exchanger 23 and to perform gas/liquid separation into a liquid-state (liquid-phase) refrigerant and the gaseous-state refrigerant. The liquid receiver 24 has a liquid reservoir 24a that stores the liquid-state refrigerant, an outlet that leads the liquid-state refrigerant to the evaporator 25, and an outlet that leads the gaseous-state refrigerant to the compressor 21. In FIG. 1, a passage that leads the gaseous-state refrigerant to the compressor 21 is configured such that the oil contained in the circuit can return, however, an illustration thereof is omitted as FIG. 1 is a conceptual diagram.

At the time of the cabin-heating operation, the liquid receiver 24 leads the gaseous-state refrigerant, which enters from the outside heat exchanger 23, to the compressor 21. From the liquid receiver 24 to the compressor 21, only the separated gaseous-state refrigerant flows. At the time of the cabin-cooling operation, the liquid receiver 24 stores the liquid-state refrigerant, which enters from the outside heat exchanger 23, and leads a part of the liquid-state refrigerant to the evaporator 25 through the internal heat exchanger 30 and the thermostatic expansion valve 26. From the liquid receiver 24 to the evaporator 25, only the separated liquid-state refrigerant flows.

A differential pressure regulating valve 31 is provided between the liquid receiver 24 and the thermostatic expansion valve 26. The differential pressure regulating valve 31 is provided on the upstream side of the internal heat exchanger 30. The differential pressure regulating valve 31 opens when the pressure at the upstream side of the differential pressure regulating valve 31 exceeds a set pressure. The set pressure is set in advance such that the differential pressure regulating valve 31 does not open at the time of the cabin-heating operation and that the differential pressure regulating valve 31 opens only at the time of the cabin-cooling operation. By providing the differential pressure regulating valve 31, it is possible to prevent the refrigerant from flowing into the evaporator 25 from the liquid receiver 24 through the thermostatic expansion valve 26 at the time of the cabin-heating operation. Thus, it is possible to prevent the evaporator 25 from being frozen and to prevent a lubricating oil flowing in the refrigerant flow path 20 from being stored in the evaporator 25. The differential pressure regulating valve 31 may be provided between the internal heat exchanger 30 and the thermostatic expansion valve 26.

The evaporator 25 is arranged in the HVAC unit 5. In a case in which an operation mode of the refrigeration cycle 2 is a cabin-cooling mode or a dehumidifying cabin-heating mode, the evaporator 25 evaporates the refrigerant by causing the refrigerant to absorb the heat of the air to be led to the vehicle cabin. The refrigerant evaporated in the evaporator 25 flows into the compressor 21 through the internal heat exchanger 30.

The thermostatic expansion valve 26 is arranged between the internal heat exchanger 30 and the evaporator 25 and decompresses and expands the liquid-state refrigerant led from the outside heat exchanger 23 through the liquid receiver 24 and the internal heat exchanger 30. The thermostatic expansion valve 26 automatically adjusts its opening degree depending on the temperature of the refrigerant that has passed through the evaporator 25, in other words, depending on degree of superheating of the gaseous-state refrigerant.

When the load of the evaporator 25 increases, the degree of superheating of the gaseous-state refrigerant increases. As a result, the opening degree of the thermostatic expansion valve 26 increases to increase the amount of the refrigerant so as to adjust the degree of superheat. On the other hand, when the load of the evaporator 25 decreases, the degree of superheating of the gaseous-state refrigerant decreases. As a result, the opening degree of the thermostatic expansion valve 26 decreases to reduce the amount of the refrigerant so as to adjust the degree of superheat. As described above, the thermostatic expansion valve 26 performs feedback of the temperature of the gaseous-state refrigerant that has passed through the evaporator 25, thereby adjusting the opening degree such that the gaseous-state refrigerant has a suitable degree of superheat.

The internal heat exchanger 30 performs the heat exchange between the refrigerant on the upstream side of the thermostatic expansion valve 26 and the refrigerant on the downstream side of the evaporator 25 using the temperature difference therebetween.

The fixed restrictor 27 is arranged between the fluid-cooled condenser 22 and the outside heat exchanger 23 and decompresses and expands the refrigerant that has been compressed in the compressor 21 and condensed in the fluid-cooled condenser 22. An orifice or a capillary tube is used as the fixed restrictor 27, for example. An amount of restriction by the fixed restrictor 27 is preset corresponding to specific operation conditions that are used frequently.

Figure 2:
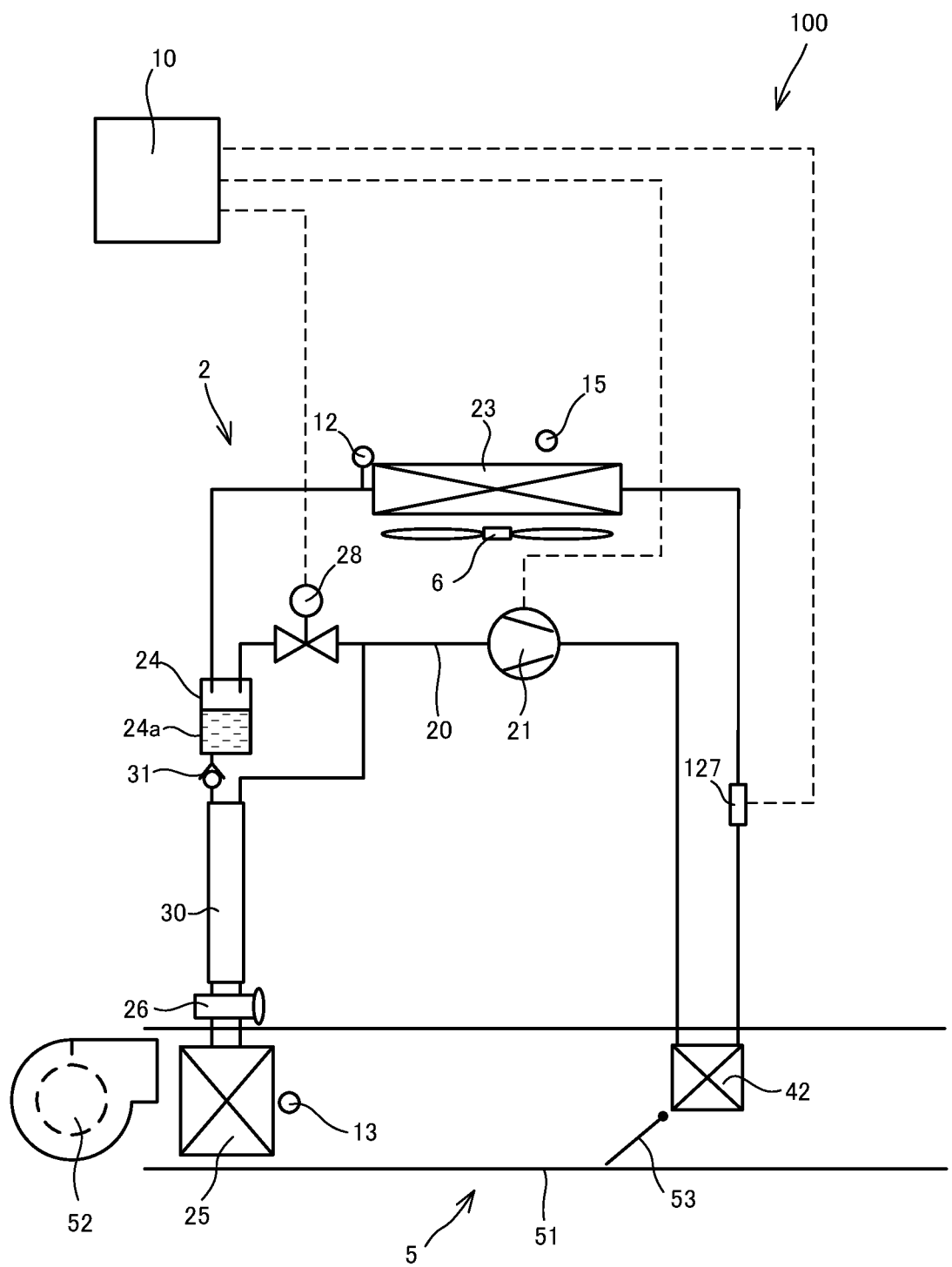
FIG. 2 is a configuration diagram of the air-conditioning device according to a modification of the first embodiment of the present invention.

As shown in FIG. 2, instead of employing the fixed restrictor 27, a variable restrictor (the restrictor mechanism), for example, a solenoid restrictor valve 127 serving as an electrical restrictor mechanism, which has at least a fully opened state and a predetermined restricted state and is capable of adjusting the opening degree stepwisely or seamlessly, may be employed. In this case, there is no need to provide the bypass channel 20a. At the time of the cabin-cooling operation, the solenoid restrictor valve 127 is adjusted such that the flow of the refrigerant is not restricted, and at the time of the cabin-heating operation, the solenoid restrictor valve 127 is adjusted such that the flow of the refrigerant is restricted.

The first flow path switching valve 28 switches the flow of the refrigerant by being opened/closed. The first flow path switching valve 28 is a solenoid valve having a solenoid controlled by the controller 10.

At the time of the cabin-cooling operation, the first flow path switching valve 28 is closed. By doing so, the refrigerant that has been condensed in the outside heat exchanger 23 flows into the liquid receiver 24. Then, the pressure at the upstream side of the differential pressure regulating valve 31 exceeds the set pressure, and the liquid-state refrigerant is led into the compressor 21 by passing through the internal heat exchanger 30, the thermostatic expansion valve 26, and the evaporator 25. On the other hand, at the time of the cabin-heating operation, the first flow path switching valve 28 is opened. By doing so, the refrigerant that has been evaporated in the outside heat exchanger 23 flows into the liquid receiver 24, and is led to the compressor 21 by passing through the first flow path switching valve 28. Thus, at the time of the cabin-heating operation, the refrigerant flows by bypassing the internal heat exchanger 30, the thermostatic expansion valve 26, and the evaporator 25.

The second flow path switching valve 29 switches the flow of the refrigerant by being opened/closed. The second flow path switching valve 29 is the solenoid valve having the solenoid controlled by the controller 10.

At the time of the cabin-cooling operation, the second flow path switching valve 29 is opened. By doing so, the refrigerant that has been compressed in the compressor 21 passes through the fluid-cooled condenser 22, and thereafter, flows into the outside heat exchanger 23 by bypassing the fixed restrictor 27. On the other hand, at the time of the cabin-heating operation, the second flow path switching valve 29 is closed. By doing so, the refrigerant that has been compressed in the compressor 21 passes through the fluid-cooled condenser 22 and the fixed restrictor 27 and flows into the outside heat exchanger 23.

The hot-water cycle 4 is provided with a water pump 41 serving as a pump, the heater core 42, a hot water heater 43 serving as an auxiliary heater unit, the fluid-cooled condenser 22, and a hot water flow path 40 that connects these components such that the hot water can circulates therethrough.

The water pump 41 circulates the hot water in the hot water flow path 40.

The heater core 42 is arranged in the HVAC unit 5 and heats the air to be used for the air-conditioning by the heat exchange between the air passing through the heater core 42 and the hot water at the time of the cabin-heating operation.

The hot water heater 43 assists heating of the air to be led to the vehicle cabin. The hot water heater 43 has a heater (not shown) inside thereof, and heats the hot water using an external power. A sheathed heater or a PTC (Positive Temperature Coefficient) heater is employed as the heater, for example.

Instead of employing the hot water heater 43, it may be possible to employ, for example, an air heater (not shown) that directly heats the air to be led to the vehicle cabin, or a hot-water heat exchanger (not shown) that heats the air to be led to the vehicle cabin using exhaust heat of an engine (not shown) as an internal combustion engine of the vehicle. In addition, any one of the hot water heater 43, the air heater, and the hot-water heat exchanger may be used alone, or they may be used in any combination.

The HVAC unit 5 cools or heats the air to be used for the air-conditioning. The HVAC unit 5 is provided with a blower 52, an air mix door 53, and a case 51 that surrounds these components such that the air to be used for the air-conditioning can pass through. The evaporator 25 and the heater core 42 are arranged in the HVAC unit 5. The air sent from the blower 52 is subjected to the heat exchange with the refrigerant flowing in the evaporator 25 and the heat exchange with the hot water flowing in the heater core 42.

The blower 52 is an air blower that sends the air into the HVAC unit 5.

The air mix door 53 adjusts the amount of the air passing through the heater core 42 arranged in the HVAC unit 5. The air mix door 53 is arranged on the blower 52 side of the heater core 42. The air mix door 53 opens the heater core 42 side at the time of the cabin-heating operation, and closes the heater core 42 side at the time of the cabin-cooling operation. The amount of heat exchange between the air and the hot water in the heater core 42 is adjusted depending on an opening degree of the air mix door 53.

In the air-conditioning device 100, an outside-heat-exchanger-outlet temperature sensor 12 serving as a refrigerant temperature detector, an evaporator temperature sensor 13 serving as an evaporating unit temperature detector, and an outside temperature sensor 15 serving as an outside-air temperature detector are arranged.

The outside-heat-exchanger-outlet temperature sensor 12 is provided at the outlet of the outside heat exchanger 23 and detects the temperature of the refrigerant in the refrigerant flow path 20. The outside-heat-exchanger-outlet temperature sensor 12 detects the temperature of the refrigerant that has passed through the outside heat exchanger 23.

The outside temperature sensor 15 detects the temperature of the outside air before being taken into and passing through the outside heat exchanger 23.

The evaporator temperature sensor 13 is arranged at the downstream side of the evaporator 25 in the HVAC unit 5 along the air flow and detects the temperature of the air that has passed through the evaporator 25. The evaporator temperature sensor 13 may be provided directly on the evaporator 25.

The controller 10 is a microcomputer that is configured with a CPU (Central Processing Unit), a ROM (Read Only Memory), a RAM (Random Access Memory), and so forth. The controller 10 may also be configured with a plurality of microcomputers. The controller 10 exerts various functions of the air-conditioning device 100 by reading out programs stored in the ROM with the CPU.

The controller 10 is programmed so as to perform a control the refrigeration cycle 2. Signals from the outside-heat-exchanger-outlet temperature sensor 12, the evaporator temperature sensor 13, and the outside temperature sensor 15 are input to the controller 10. Signals from other sensors, which are not shown, may be input to the controller 10.

The controller 10 performs the control of the refrigeration cycle 2 on the basis of the input signals. Namely, as shown by broken lines in FIG. 1, the controller 10 sets output of the compressor 21 and performs open/close control of the first flow path switching valve 28 and the second flow path switching valve 29. In addition, the controller 10 also performs a control of the hot-water cycle 4 and a control of the HVAC unit 5 by sending output signals (not shown).

Figure 4:
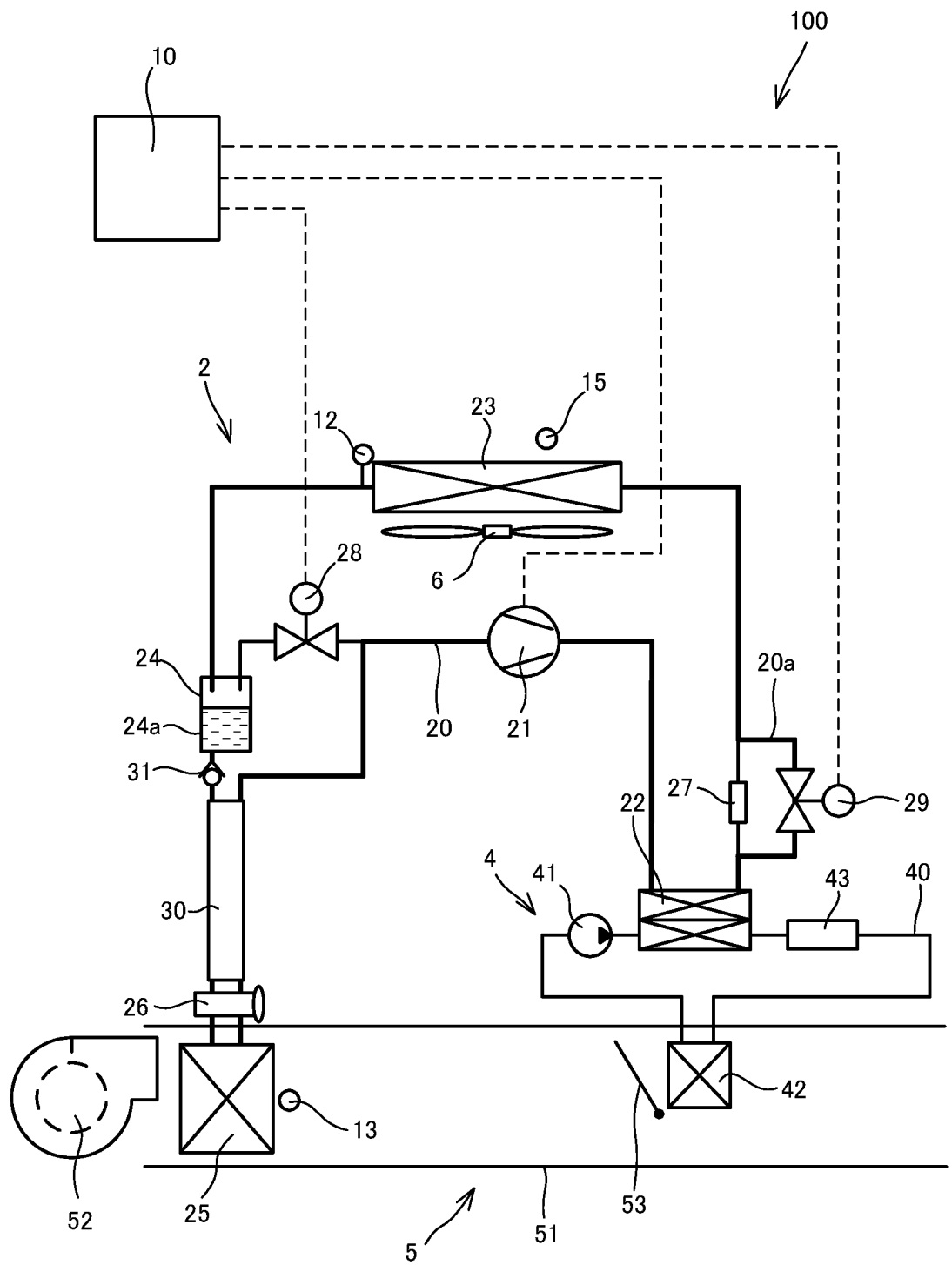
FIG. 4 is a diagram for explaining a flow of a refrigerant of the air-conditioning device in a cabin-cooling mode.
Figure 5:
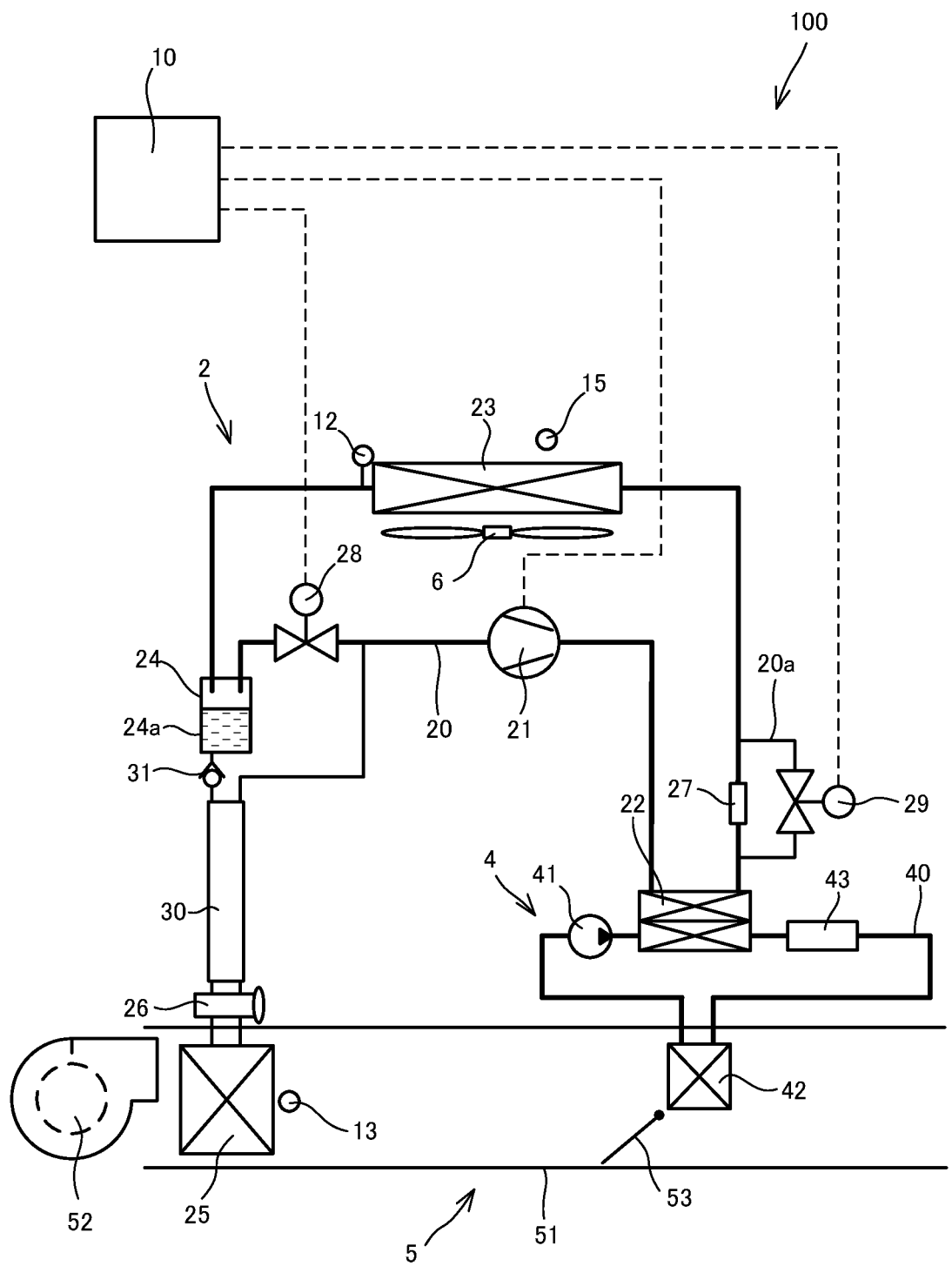
FIG. 5 is a diagram for explaining the flow of the refrigerant of the air-conditioning device in a heat pump cabin-heating mode.
Figure 6:
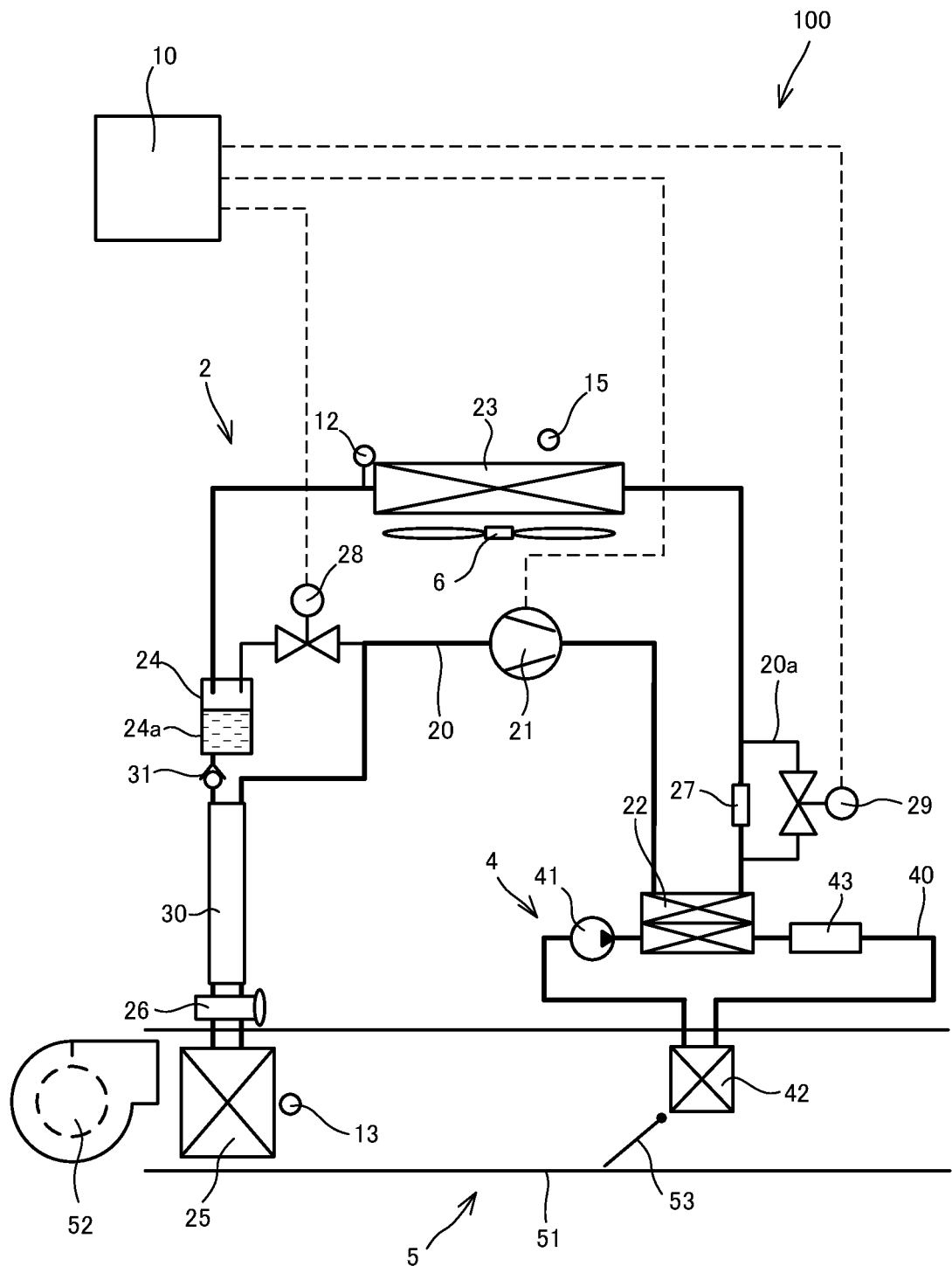
FIG. 6 is a diagram for explaining the flow of the refrigerant of the air-conditioning device in a dehumidifying cabin-heating mode.

Next, respective air-conditioning operation modes of the air-conditioning device 100 will be described with reference to FIGS. 4 to 6.

<Cabin-Cooling Operation>

At the time of the cabin-cooling operation, an operation mode of the refrigeration cycle 2 is switched to the cabin-cooling mode. In the cabin-cooling mode, the refrigerant in the refrigeration cycle 2 circulates as shown by thick solid lines in FIG. 4.

The controller 10 closes the first flow path switching valve 28 and opens the second flow path switching valve 29.

The refrigerant that has become high temperature and high pressure by being compressed by the compressor 21 flows to the outside heat exchanger 23 through the fluid-cooled condenser 22 and the second flow path switching valve 29. At this time, since the hot water in the hot-water cycle 4 is not circulated, almost no heat exchange is performed in the fluid-cooled condenser 22. In addition, the refrigerant bypasses the fixed restrictor 27 and passes through the bypass channel 20a. In a case in which the solenoid restrictor valve 127 (see FIG. 2) is provided instead of the fixed restrictor 27, the solenoid restrictor valve 127 is adjusted so as not to restrict the flow of the refrigerant.

The refrigerant that has reached the outside heat exchanger 23 is cooled through the heat exchange with the outside air introduced to the outside heat exchanger 23, and thereafter, the refrigerant is subjected to the gas/liquid separation in the liquid receiver 24. As a result, the liquid-state refrigerant is stored in the liquid receiver 24. A part of the liquid-state refrigerant in the liquid receiver 24 flows via the internal heat exchanger 30 into the thermostatic expansion valve 26 connected on the downstream side of the liquid receiver 24.

Thereafter, the liquid-state refrigerant is decompressed and expanded by the thermostatic expansion valve 26 and flows into the evaporator 25. While passing through the evaporator 25, the liquid-state refrigerant is evaporated by absorbing the heat of the air to be used for the air-conditioning. The gaseous-state refrigerant that has been obtained by the evaporation in the evaporator 25 passes through the internal heat exchanger 30 and flows again into the compressor 21.

In other words, in the cabin-cooling mode, the high-pressure refrigerant discharged from the compressor 21 passes through the fluid-cooled condenser 22, the high-pressure refrigerant that has passed through the fluid-cooled condenser 22 flows into the outside heat exchanger 23, the liquid receiver 24 stores the liquid-state refrigerant obtained by separating the refrigerant that has been led from the outside heat exchanger 23 into the gaseous-state refrigerant and the liquid-state refrigerant, the thermostatic expansion valve 26 decompresses and expands the liquid-state refrigerant that has been led from the liquid receiver 24, the evaporator 25 evaporates the refrigerant by performing the heat exchange between the low-pressure refrigerant that has been decompressed and expanded by the thermostatic expansion valve 26 and the air to be led to the vehicle cabin, and the gaseous-state refrigerant is led to the compressor 21.

The liquid-state refrigerant flowing from the liquid receiver 24 to the internal heat exchanger 30 is a high-pressure fluid and is in a substantially saturated liquid state at which a degree of supercooling is about 0° C. after being subjected to the gas/liquid separation in the liquid receiver 24. On the other hand, the gaseous-state refrigerant flowing from the evaporator 25 to the internal heat exchanger 30 has become a low-temperature fluid by being decompressed and expanded while flowing through the thermostatic expansion valve 26. Therefore, the liquid-state refrigerant is subjected to the heat exchange with the low-temperature gaseous-state refrigerant while flowing through the internal heat exchanger 30, and the liquid-state refrigerant transits from the saturated liquid state to the supercooled state with the supercooling degree by being supercooled by the gaseous-state refrigerant. In addition, the gaseous-state refrigerant reaches a heated state with the degree of superheating by being heated by the liquid-state refrigerant while flowing through the internal heat exchanger 30.

The air that has been cooled with the refrigerant in the evaporator 25 is used as cabin cooling wind by flowing towards the downstream side of the HVAC unit 5.

<Cabin-Heating Operation>

At the time of the cabin-heating operation, the operation mode of the refrigeration cycle 2 is switched to a heat pump cabin-heating mode. At the time of the cabin-heating operation, so called outside-air heat-absorbing heat pump operation is performed. In the heat pump cabin-heating mode, the refrigerant in the refrigeration cycle 2 and the hot water in the hot-water cycle 4 circulate as shown by the thick solid lines in FIG. 5.

The controller 10 opens the first flow path switching valve 28 and closes the second flow path switching valve 29.

The refrigerant that has become high temperature by being compressed in the compressor 21 flows to the fluid-cooled condenser 22. The refrigerant that has reached the fluid-cooled condenser 22 heats the hot water within the fluid-cooled condenser 22, becomes low temperature by being decompressed and expanded by flowing through the fixed restrictor 27, and flows to the outside heat exchanger 23.

The refrigerant that has reached the outside heat exchanger 23 is subjected to the heat exchange with the outside air introduced to the outside heat exchanger 23, and thereafter, the refrigerant flows to the liquid receiver 24 and is subjected to the gas/liquid separation. Then, the gaseous-state refrigerant separated by the gas/liquid separation in the liquid receiver 24 flows again to the compressor 21 through the first flow path switching valve 28. Thus, in the heat pump cabin-heating mode, the liquid-state refrigerant is stored in the liquid receiver 24, and the gaseous-state refrigerant is led to the compressor 21.

In other words, in the heat pump cabin-heating mode, the fluid-cooled condenser 22 performs the heat exchange via the hot-water cycle 4 between the high-pressure refrigerant that has been discharged from the compressor 21 and the air to be led to the vehicle cabin, the refrigerant that has been led from the fluid-cooled condenser 22 is decompressed and expanded by the fixed restrictor 27, the refrigerant that has been decompressed and expanded by the fixed restrictor 27 flows into the outside heat exchanger 23, the liquid receiver 24 separates the low-pressure refrigerant that has been led from the outside heat exchanger 23 into the gaseous-state refrigerant and the liquid-state refrigerant, and the gaseous-state refrigerant is led to the compressor 21.

On the other hand, the hot water that has been heated with the refrigerant in the fluid-cooled condenser 22 circulates and flows into the heater core 42, thereby heating the surrounding air of the heater core 42. The heated air flows towards the downstream side of the HVAC unit 5 and is used as a cabin-heating wind.

In the case in which the hot water cannot be heated sufficiently with the refrigerant in the fluid-cooled condenser 22, the hot water may be heated by operating the hot water heater 43 alone or in combination with the outside-air heat-absorbing heat pump operation.

<Dehumidifying Cabin-Heating Operation>

At the time of the dehumidifying cabin-heating operation, the refrigeration cycle 2 is operated in the dehumidifying cabin-heating mode as the first operation mode, and the operation mode is temporarily switched to the cabin-cooling mode as the second operation mode. Switching between the dehumidifying cabin-heating mode and the cabin-cooling mode will be described in more detail later with reference to FIG. 8. Since the cabin-cooling mode is the same as in the case of the cabin-cooling operation, the detailed description thereof will be omitted. In the dehumidifying cabin-heating mode, the refrigerant in the refrigeration cycle 2 and the hot water in the hot-water cycle 4 are circulated as shown by the thick solid lines in FIG. 6.

The controller 10 closes the first flow path switching valve 28 and closes the second flow path switching valve 29.

The refrigerant that has become high temperature by being compressed in the compressor 21 flows to the fluid-cooled condenser 22. The refrigerant that has reached the fluid-cooled condenser 22 heats the hot water within the fluid-cooled condenser 22, becomes low temperature by being decompressed and expanded by passing through the fixed restrictor 27, and flows to the outside heat exchanger 23. In a case in which the solenoid restrictor valve 127 (see FIG. 2) is provided instead of the fixed restrictor 27, the solenoid restrictor valve 127 is adjusted so as to restrict the flow of the refrigerant.

The refrigerant that has reached the outside heat exchanger 23 is subjected to the heat exchange with the outside air introduced to the outside heat exchanger 23, and thereafter, the refrigerant is subjected to the gas/liquid separation in the liquid receiver 24. Then, the liquid-state refrigerant stored in the liquid receiver 24 in the cabin-cooling mode and the liquid-state refrigerant separated by the gas/liquid separation in the liquid receiver 24 flows via the internal heat exchanger 30. As described above, in the dehumidifying cabin-heating mode, the liquid-state refrigerant stored in the liquid receiver 24 is led to the evaporator 25.

Thereafter, the liquid-state refrigerant is decompressed and expanded by the thermostatic expansion valve 26 and flows into the evaporator 25. While passing through the evaporator 25, the liquid-state refrigerant is evaporated by absorbing the heat of the air to be used for the air-conditioning. The gaseous-state refrigerant that has been obtained by the evaporation in the evaporator 25 passes through the internal heat exchanger 30 and flows again into the compressor 21.

In other words, in the dehumidifying cabin-heating mode, the fluid-cooled condenser 22 performs the heat exchange between the high-pressure refrigerant that has been discharged from the compressor 21 and the air to be led to the vehicle cabin, the refrigerant that has been led from the fluid-cooled condenser 22 is decompressed and expanded by the fixed restrictor 27, the refrigerant, the pressure of which is made intermediate by being decompressed and expanded by the fixed restrictor 27, flows into the outside heat exchanger 23, the liquid receiver 24 separates the refrigerant that has been led from the outside heat exchanger 23 into the gaseous-state refrigerant and the liquid-state refrigerant, the thermostatic expansion valve 26 decompresses and expands the liquid-state refrigerant that has been led from the liquid receiver 24, the evaporator 25 evaporates the refrigerant by the heat exchange between the refrigerant, the pressure of which is made low by being decompressed and expanded by the thermostatic expansion valve 26, and the air to be led to the vehicle cabin, and the gaseous-state refrigerant is led to the compressor 21.

Thus, in the dehumidifying cabin-heating mode, the first flow path switching valve 28 is switched such that the refrigerant passes through the thermostatic expansion valve 26 and the second flow path switching valve 29 is switched such that the refrigerant passes through the fixed restrictor 27.

Figure 7:
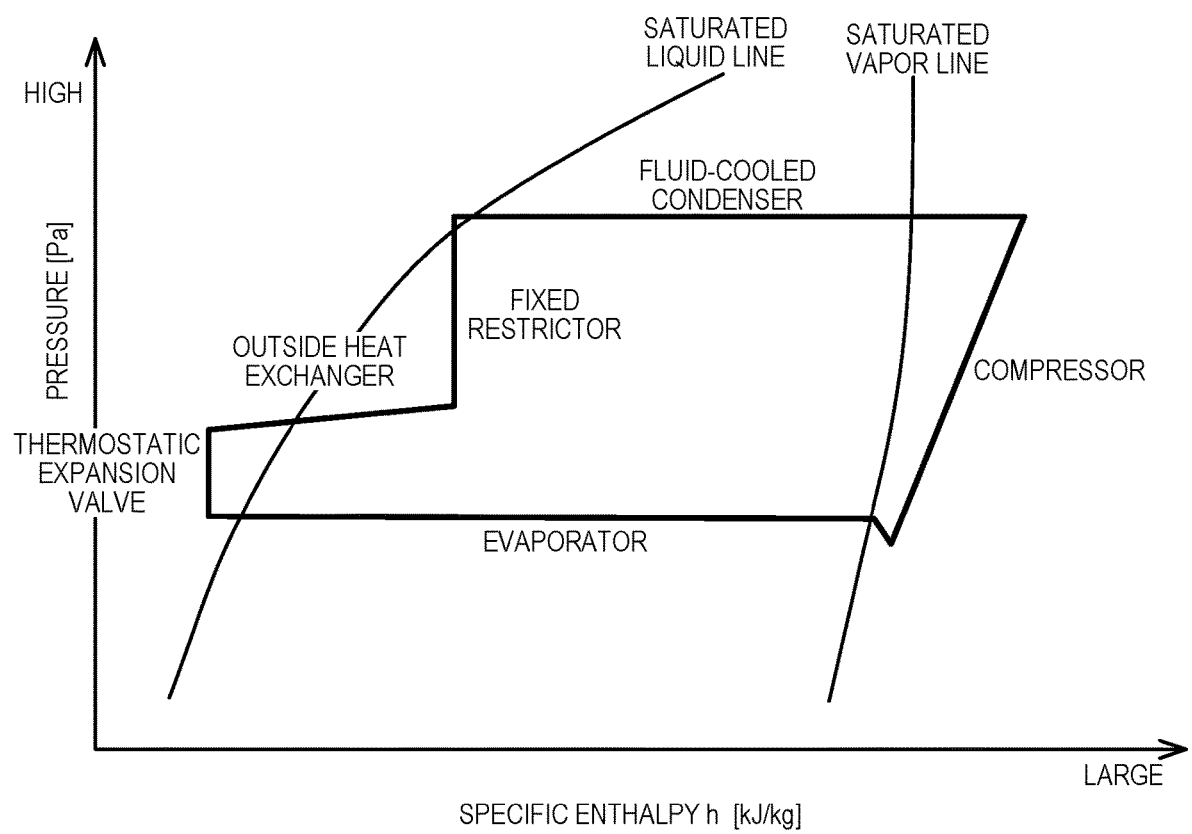
FIG. 7 is a Mollier diagram for explaining the dehumidifying cabin-heating mode.

As shown in FIG. 7, in the dehumidifying cabin-heating mode, the refrigerant that has been compressed by the compressor 21 is subjected to the heat exchange in the fluid-cooled condenser 22, and thereafter the pressure of the refrigerant is decreased by passing the fixed restrictor 27. After performing the heat exchange in the outside heat exchanger 23, the pressure of the refrigerant is further decreased by the thermostatic expansion valve 26.

The air flows towards the downstream side of the HVAC unit 5 is used as the dehumidifying cabin-heating wind by being dehumidified by the evaporator 25 and being heated by the heater core 42.

In the case in which the hot water cannot be heated sufficiently with the refrigerant in the fluid-cooled condenser 22, the hot water may be heated by operating the hot water heater 43 alone or in combination with the outside-air heat-absorbing heat pump operation.

Figure 8:
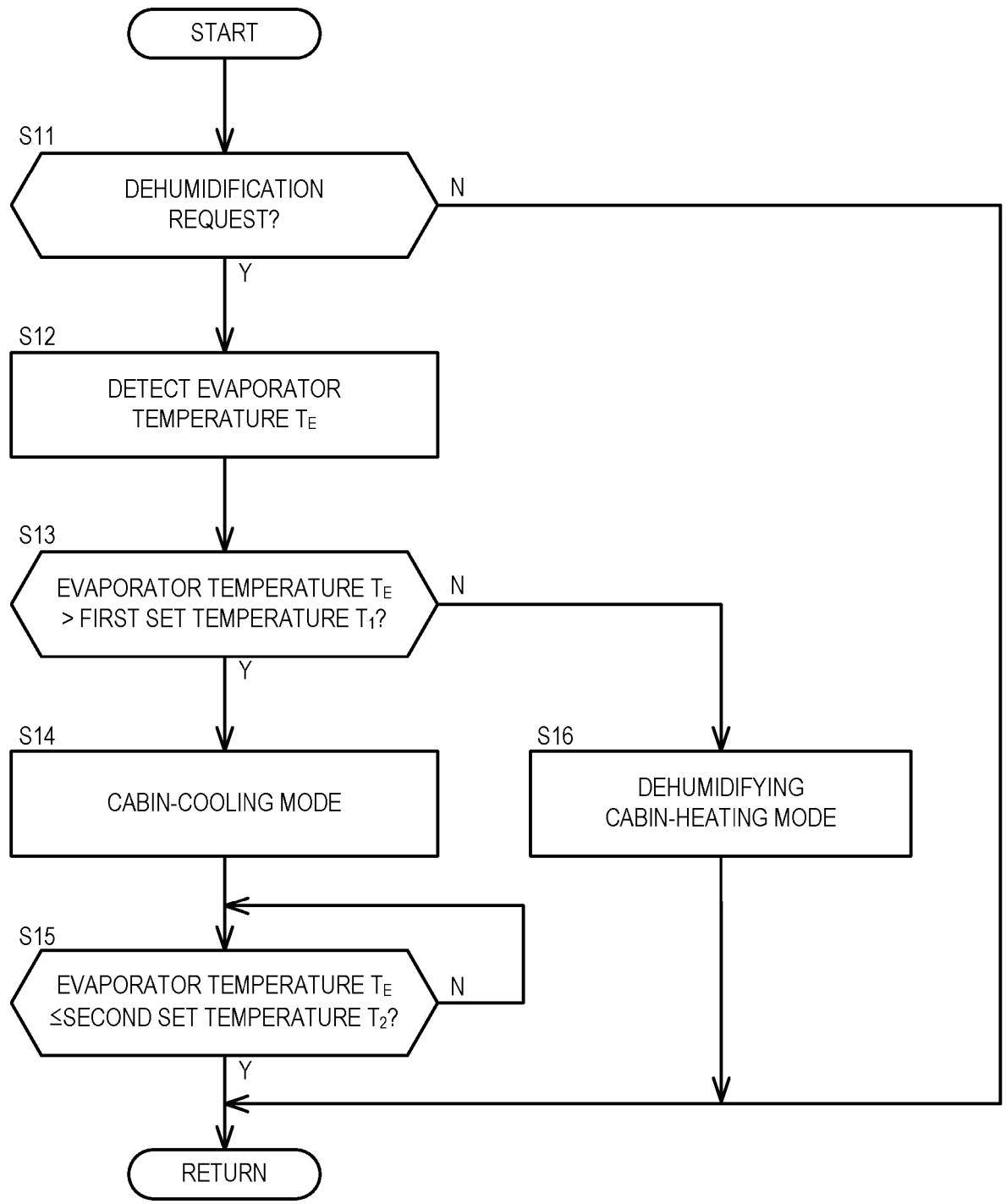
FIG. 8 is a diagram for explaining a switch between a first operation mode and a second operation mode when there is a dehumidification request.

Next, mainly referring to FIG. 8, the switching between the dehumidifying cabin-heating mode and the cabin-cooling mode when there is a dehumidification request will be described. The controller 10 repeatedly executes the routine shown in FIG. 8 at predetermined intervals, for example, every 10 milliseconds.

In step S11, the controller 10 determines whether or not there is the dehumidification request. Here, the dehumidification request means a state in which an A/C (air-conditioning device) switch on the operation panel in the vehicle cabin is operated to be on. When there is the dehumidification request, the refrigerant flowing through the evaporator 25 cools the air to be led into the vehicle cabin such that moisture is condensed in the evaporator 25, and thus the vehicle cabin is dehumidified. That is, when there is the dehumidification request, the refrigeration cycle 2 is operated in the cabin-cooling mode or the dehumidifying cabin-heating mode.

If it is determined in step S11 that there is the dehumidification request, the process proceeds to step S12. On the other hand, when it is determined in step S11 that there is no dehumidification request, since the A/C switch is not operated to be turned on, the process just returns and exits.

In step S12, the controller 10 detects a temperature $T_E$ of the evaporator 25 based on the signal inputted from the evaporator temperature sensor 13.

In step S13, the controller 10 determines whether or not the temperature $T_E$ of the evaporator 25 detected in step S12 is higher than a first set temperature $T_1$ as a set temperature. The first set temperature $T_1$ is set to an upper limit of a temperature at which the evaporator 25 can sufficiently cool air when the liquid-state refrigerant flowing from the liquid receiver 24 to the evaporator 25 decreases and the temperature of the evaporator 25 rises.

If it is determined in step S13 that the temperature $T_E$ of the evaporator 25 is higher than the first set temperature $T_1$, the process proceeds to step S14. On the other hand, if it is determined in step S13 that the temperature $T_E$ of the evaporator 25 is equal to or lower than the first set temperature $T_1$, the process proceeds to step S16.

In step S14, since the liquid-state refrigerant is not sufficiently flowing from the liquid receiver 24 to the evaporator 25, in order to store the liquid-state refrigerant in the liquid receiver 24, the controller 10 operates the refrigeration cycle 2 in the cabin-cooling mode. At this time, when the temperature of the air led to the vehicle cabin is lower than the target temperature, using the hot water heated by the hot water heater 43, the air cooled by passing through the evaporator 25 is heated (reheated).

Thus, in the dehumidifying cabin-heating mode, the operation mode is switched to the cabin-cooling mode when the temperature $T_E$ of the evaporator 25 becomes higher than the first set temperature $T_1$. Specifically, in the dehumidifying cabin-heating mode, the operation mode is switched to the cabin-cooling mode when the temperature detected by the evaporator temperature sensor 13 becomes higher than the set temperature. When the refrigeration cycle 2 is operated in the cabin-cooling mode, the liquid-state refrigerant is stored in the liquid receiver 24 and the temperature of the evaporator 25 decreases.

In the dehumidifying cabin-heating mode, the operation mode may be switched to the cabin-cooling mode when the state in which the temperature detected by the evaporator temperature sensor 13 is higher than the set temperature continues for a set time period or more. In this case, the switching to the cabin-cooling mode is suppressed even if the signal input from the evaporator temperature sensor 13 to the controller 10 temporarily indicates a state in which the temperature is higher than the set temperature due to an influence of noise or the like.

Instead of determining whether the temperature $T_E$ of the evaporator 25 becomes higher than the first set temperature $T_1$, the operation mode may be switched from the dehumidifying cabin-heating mode to the cabin-cooling mode on the basis of the refrigerant pressure which is an alternative characteristics of the temperature.

In step S15, the controller 10 determines whether or not the temperature $T_E$ of the evaporator 25 detected in step S12 is equal to or less than the second set temperature $T_2$. The second set-point temperature $T_2$ is set lower than the first set temperature $T_1$. Thus, it is suppressed that the operation mode returns to the dehumidifying cabin-heating mode when the temperature $T_E$ of the evaporator 25 decreases equal to or less than the first set temperature $T_1$ immediately after the temperature $T_E$ of the evaporator 25 becomes higher than the first set temperature $T_1$.

When it is determined in step S15 that the temperature $T_E$ of the evaporator 25 is equal to or less than the second set temperature $T_2$, the process returns and exits. In this case, since the temperature $T_E$ of the evaporator 25 is equal to or less than the second set temperature $T_2$, the temperature $T_E$ of the evaporator 25 is always equal to or less than the first set temperature $T_1$. Therefore, the process proceeds to step S16 in the next routine, and the refrigeration cycle 2 is switched to the dehumidifying cabin-heating mode. On the other hand, when it is determined in step S15 that the temperature $T_E$ of the evaporator 25 is higher than the second set temperature $T_2$, the process of step S15 is repeated. During this processing, the controller 10 operates the refrigeration cycle 2 in the cabin-cooling mode.

On the other hand, in step S16, since the liquid-state refrigerant sufficiently flows from the liquid receiver 24 to the evaporator 25, the controller 10 operates the refrigeration cycle 2 in the dehumidifying cabin-heating mode.

As described above, when there is the dehumidification request, the controller 10 temporarily switches the operation mode from the dehumidifying cabin-heating mode (first operation mode) which evaporates the refrigerant by the evaporator 25 and radiates heat by the fluid-cooled condenser 22 in the state in which the flow of the refrigerant is restricted by the fixed restrictor 27, to the cabin-cooling mode (second operation mode) which evaporates the refrigerant by the evaporator 25 and promotes the storage of the liquid-state refrigerant in the liquid receiver 24 in the state in which the flow of the refrigerant is not restricted by the fixed restrictor 27.

In the dehumidifying cabin-heating mode, while performing the cabin-heating operation, the liquid-state refrigerant stored in the liquid receiver 24 is led to the evaporator 25. In the cabin-cooling mode, storing the liquid-state refrigerant, which is a part of the refrigerant led from the outside heat exchanger 23, in the liquid receiver 24 is promoted. Therefore, by temporarily switching to the cabin-cooling mode, the liquid-state refrigerant can be stored in the liquid receiver 24, and in the dehumidifying cabin-heating mode, it is possible to perform dehumidification using the liquid-state refrigerant in the liquid receiver 24 while performing the cabin-heating operation. Therefore, it is possible to stably perform the dehumidifying cabin-heating operation which performs dehumidification while maintaining the cabin-heating state.

If there is the dehumidification request at the time of startup of the air-conditioning device 100, the refrigeration cycle 2 is switched to the cabin-cooling mode first. For example, when starting the air-conditioning device 100 at the time of a cold start, the liquid-state refrigerant may not be sufficiently stored in the liquid receiver 24. Therefore, by operating the refrigeration cycle 2 in the cabin-cooling mode first, it is possible to store the liquid-state refrigerant in the liquid receiver 24.

According to the first embodiment described above, the following effects are obtained.

The air-conditioning device 100 mounted on the vehicle includes the compressor 21 that compresses the refrigerant, the outside heat exchanger 23 that perform heat exchange between the refrigerant and the outside air, the evaporator 25 that evaporates the refrigerant by causing the refrigerant to absorb heat of the air to be led to the vehicle cabin, the fluid-cooled condenser 22 that heats the air to be led to the vehicle cabin using the heat of the refrigerant compressed by the compressor 21, the liquid receiver 24 arranged at the downstream side of the outside heat exchanger 23, the liquid receiver 24 separating the refrigerant led from the outside heat exchanger 23 into the liquid-state refrigerant and the gaseous-state refrigerant and store the liquid-state refrigerant, the fixed restrictor 27 provided between the fluid-cooled condenser 22 and the outside heat exchanger 23, the fixed restrictor 27 decompressing and expanding the refrigerant, and the thermostatic expansion valve 26 provided between the outside heat exchanger 23 and the evaporator 25, the thermostatic expansion valve 26 decompressing and expanding the refrigerant that has passed through the outside heat exchanger 23. When there is the dehumidification request, the operation mode is temporarily switched from the dehumidifying cabin-heating mode which evaporates the refrigerant by the evaporator 25 and radiates heat by the fluid-cooled condenser 22 in the state in which the fixed restrictor restricts the flow of the refrigerant, to the cabin-cooling mode which evaporates the refrigerant by the evaporator and promote the storage of the liquid-state refrigerant in the liquid receiver 24 in the state in which the fixed restrictor does not restrict the flow of the refrigerant.

In this configuration, when there is the dehumidification request, the controller 10 temporarily switches the operation mode from the dehumidifying cabin-heating mode to the cabin-cooling mode. In the dehumidifying cabin-heating mode, while performing the cabin-heating operation, the liquid-state refrigerant stored in the liquid receiver 24 is led to the evaporator 25. In the cabin-cooling mode, storing the liquid-state refrigerant, which is a part of the refrigerant led from the outside heat exchanger 23, in the liquid receiver 24 is promoted. Therefore, by temporarily switching to the cabin-cooling mode, the liquid-state refrigerant can be stored in the liquid receiver 24, and in the dehumidifying cabin-heating mode, it is possible to perform dehumidification using the liquid-state refrigerant in the liquid receiver 24 while executing the cabin-heating operation. Therefore, it is possible to stably execute the dehumidifying cabin-heating operation which performs dehumidification while maintaining the cabin-heating state.

The air-conditioning device 100 further includes the second flow path switching valve 29 which switches the flow path of the refrigerant to bypass the fixed restrictor 27. In the dehumidifying cabin-heating mode, the second flow path switching valve 29 is switched so that the refrigerant passes through the fixed restrictor 27. In the cabin-cooling mode, the second flow path switching valve 29 is switched so that the refrigerant bypasses the fixed restrictor 27.

According to this configuration, simply by switching the second flow path switching valve 29, it is possible to switch between the dehumidifying cabin-heating mode and the cabin-cooling mode. Therefore, it is possible to switch the operation mode of the refrigeration cycle 2 during the dehumidifying cabin-heating operation with a simple configuration.

The restrictor mechanism is the solenoid restrictor valve 127 which can adjust its opening, and in the dehumidifying cabin-heating mode, the solenoid restrictor valve 127 is adjusted to restrict the flow of refrigerant, whereas in the cabin-cooling mode, the solenoid restrictor valve 127 is adjusted so as not to restrict the flow of refrigerant.

According to this configuration, simply by adjusting the opening degree of the electromagnetic restrictor valve 127, it is possible to switch between the dehumidifying cabin-heating mode and the cabin-cooling mode. Therefore, it is possible to switch the operation mode of the refrigeration cycle 2 during the dehumidifying cabin-heating operation with a simple configuration.

When the temperature of the evaporator 25 becomes higher than the first set temperature $T_1$ in the dehumidifying cabin-heating mode, the operation mode is switched to the cabin-cooling mode.

The air-conditioning device 100 further includes the evaporator temperature sensor 13 for detecting the temperature of the evaporator 25. The operation mode is switched to the cabin-cooling mode when the temperature $T_E$ detected by the evaporator temperature sensor 13 becomes higher than the first set temperature $T_1$ in the dehumidifying cabin-heating mode.

According to these configurations, the state in which the liquid-state refrigerant does not sufficiently flow from the liquid receiver 24 to the evaporator 25 can be detected, and it is possible to store the liquid-state refrigerant in the liquid receiver 24 by temporarily switching the refrigeration cycle 2 from the dehumidifying cabin-heating mode to the cabin-cooling mode.

The operation mode is switched to the cabin-cooling mode when the state in which the temperature $T_E$ of the evaporator 25 is higher than the first set temperature $T_1$ continues for the set time period or more in the dehumidifying cabin-heating mode.

According to this configuration, the switching to the cabin-cooling mode is suppressed even if the signal input from the evaporator temperature sensor 13 to the controller temporarily becomes higher than the set temperature due to the influence of noise or the like.

The air-conditioning device 100 further includes the hot water heater 43 which assists in heating the air to be led to the vehicle cabin. In the cabin-cooling mode, the hot water heater 43 heats the air that has passed through the evaporator 25 and is led to the vehicle cabin.

The auxiliary heater unit is at least one of an air heater that directly heats the air to be led to the vehicle cabin, the hot water heater 43 that heats hot water for heating the air to be led to the vehicle cabin, and the hot water heat exchanger that heats the air to be led to the vehicle cabin using the exhaust heat of the internal combustion engine of the vehicle.

In these configurations, when the refrigeration cycle 2 is in the cabin-cooling mode, using, for example, hot water heated by the hot water heater 43, the air cooled by passing through the evaporator 25 is heated. Therefore, the air cooled by passing through the evaporator 25 is not directly led to the vehicle cabin, and instead, the air heated (reheated) by the hot water heater 43 or the like can be led to the vehicle cabin.

If there is the dehumidification request at the time of startup of the air-conditioning device 100, the operation starts in the dehumidifying cabin-heating mode.

According to this configuration, for example, when starting the air-conditioning device 100 at the time of the cold start, by operating the refrigeration cycle 2 in the cabin-cooling mode first, it is possible to store the liquid-state refrigerant in the liquid receiver 24.

The air-conditioning device 100 further includes the expansion valve provided between the outside heat exchanger 23 and the evaporator 25. The expansion valve decompresses and expands the refrigerant that has passed through the outside heat exchanger 23. The expansion valve is the thermostatic expansion valve 26 which adjusts the opening degree depending on the temperature of the refrigerant that has passed through the evaporator 25.

According to this configuration, when the refrigeration cycle 2 operates in the cabin-cooling mode or the dehumidifying cabin-heating mode, since it is possible to lead only gaseous-state refrigerant to the compressor 21, it is not necessary to further provide an accumulator on the upstream side of the compressor 21.

The air-conditioning device 100 further includes the internal heat exchanger 30 that performs heat exchange between the upstream refrigerant and the downstream refrigerant of the thermostatic expansion valve 26 and the evaporator 25.

According to this configuration, the liquid-state refrigerant led from the liquid receiver 24 is subjected to the heat exchange with the low-temperature gaseous-state refrigerant while flowing through the internal heat exchanger 30. The liquid-state refrigerant is supercooled by the gaseous-state refrigerant and transits from the saturated liquid state to the supercooled state with the supercooling degree. Therefore, by providing the internal heat exchanger 30, the liquid-state refrigerant is easily led to the thermostatic expansion valve 26.

Second Embodiment

The air-conditioning device 200 according to the second embodiment of the present invention will be described below with reference to FIGS. 9 to 11. In each of the embodiments shown below, differences from the first embodiment will be mainly described, and components that have similar functions are assigned the same reference numerals and descriptions thereof will be omitted.

Figure 9:
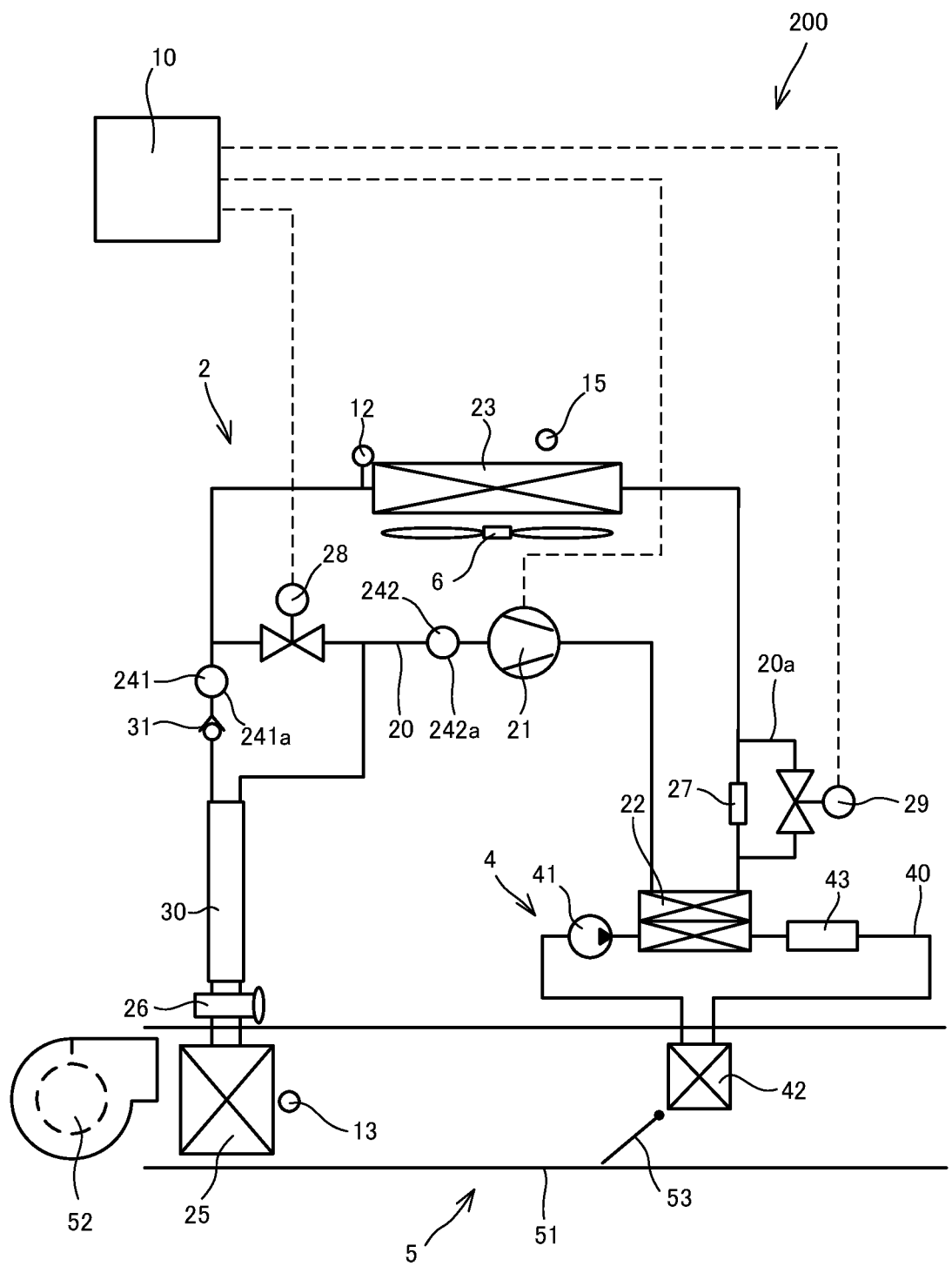
FIG. 9 is a configuration diagram of the air-conditioning device according to a second embodiment of the present invention.

As shown in FIG. 9, the air-conditioning device 200 differs from the air-conditioning device 100 according to the first embodiment in that the first liquid receiver 241 and the second liquid receiver 242 are separately provided instead of the single liquid receiver 24.

The first liquid receiver 241 is arranged at the downstream side of the outside heat exchanger 23. The first liquid receiver 241 separates the refrigerant led from the outside heat exchanger 23 into the liquid-state refrigerant and the gaseous-state refrigerant. The first liquid receiver 241 has a first liquid reservoir 241a for storing the liquid-state refrigerant.

The second liquid receiver 242 is arranged at the upstream side of the compressor 21. The second liquid receiver 242 temporarily stores the refrigerant flowing through the refrigerant flow path 20 and separates the refrigerant into the gaseous-state refrigerant and the liquid-state refrigerant by the gas/liquid separation. The second liquid receiver 242 has a second liquid reservoir 242a for storing the liquid-state refrigerant. Only the separated gaseous-state refrigerant flows to the compressor 21 from the second liquid receiver 242.

As described above, in this embodiment, the air-conditioning device 200 is provided with the two liquid reservoirs 241a and 242a that are positioned on the downstream side of the outside heat exchanger 23, to which the refrigerant from the outside heat exchanger 23 is led, and that separate the refrigerant into the liquid-state refrigerant and the gaseous-state refrigerant by the gas/liquid separation and store the liquid-phase refrigerant. The first liquid reservoir 241a has an outlet that leads out the liquid-state refrigerant obtained by subjecting the refrigerant to the gas/liquid separation, and the second liquid reservoir 242a has an outlet that leads out the gaseous-state refrigerant obtained by subjecting the refrigerant to the gas/liquid separation.

In the cabin-cooling mode, the refrigerant led from the outside heat exchanger 23 is stored in the first liquid reservoir 241a, and a part of the liquid-state refrigerant is led to the evaporator 25 through the internal heat exchanger 30 and the thermostatic expansion valve 26. The refrigerant led from the evaporator 25 flows through the second liquid reservoir 242a and the gaseous-state refrigerant is led to the compressor 21.

On the other hand, in the dehumidifying cabin-heating mode, the refrigerant led from the outside heat exchanger 23 is led to the first liquid reservoir 241a, and the liquid-state refrigerant is led to the evaporator 25 through the internal heat exchanger 30 and the thermostatic expansion valve 26. Then, the refrigerant led from the evaporator 25 flows through the second liquid reservoir 242a, and the gaseous-state refrigerant is led to the compressor 21.

At the time of the dehumidifying cabin-heating operation, the refrigeration cycle 2 is operated in the dehumidifying cabin-heating mode as the first operation mode and temporarily switched to the cabin-cooling mode as the second operation mode. In the cabin-cooling mode, the refrigerant in the refrigeration cycle 2 circulates as shown by the thick solid lines in FIG. 10. In the dehumidifying cabin-heating mode, the refrigerant in the refrigeration cycle 2 and the hot water in the hot-water cycle 4 are circulated as shown by the thick solid lines in FIG. 11.

Figure 10:
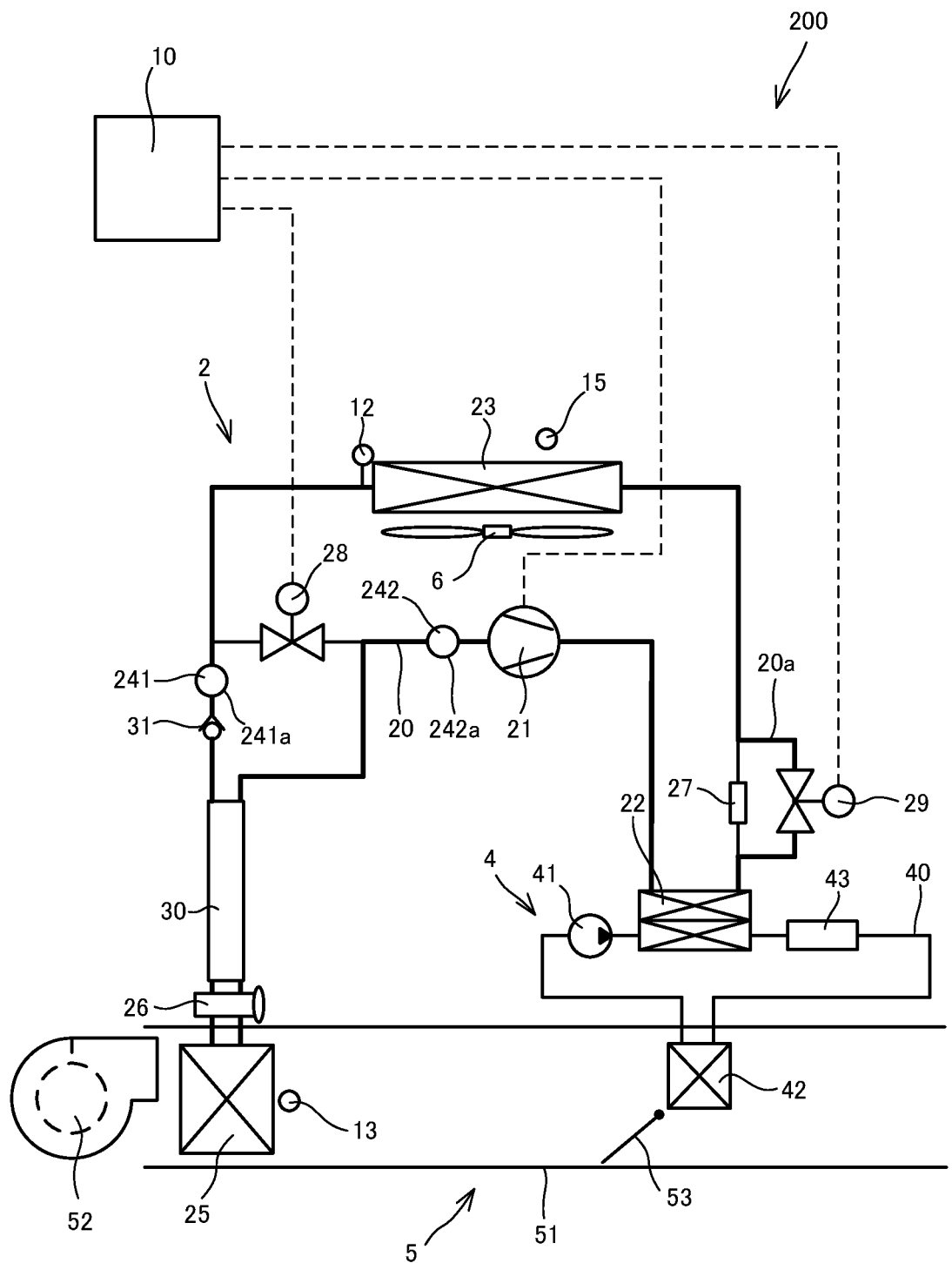
FIG. 10 is a diagram for explaining the flow of the refrigerant of the air-conditioning device in the cabin-cooling mode.

As shown in FIG. 10, in the cabin-cooling mode, the controller 10 closes the first flow path switching valve 28 and opens the second flow path switching valve 29.

The refrigerant that has become high temperature and high pressure by being compressed by the compressor flows to the outside heat exchanger 23 through the fluid-cooled condenser 22 and the second flow path switching valve 29. At this time, the hot water in the hot-water cycle is not circulated, almost no heat exchange is performed in the fluid-cooled condenser 22. In addition, the refrigerant bypasses the fixed restrictor 27 and passes through the bypass channel 20a.

The refrigerant that has reached the outside heat exchanger 23 is cooled through the heat exchange with the outside air introduced to the outside heat exchanger 23, and thereafter, the refrigerant is subjected to the gas/liquid separation in the first liquid receiver 241. As a result, the liquid-state refrigerant is stored in the liquid receiver 241. A part of the liquid-state refrigerant in the liquid receiver 241 flows via the internal heat exchanger 30 into the thermostatic expansion valve 26 connected on the downstream side of the first liquid receiver 241.

Thereafter, the liquid-state refrigerant is decompressed and expanded by the thermostatic expansion valve 26 and flows into the evaporator 25. While passing through the evaporator 25, the liquid-state refrigerant is evaporated by absorbing the heat of the air to be used for the air-conditioning. The gaseous-state refrigerant that has been obtained by the evaporation in the evaporator 25 passes through the internal heat exchanger 30 and flows again into the compressor 21 via the second liquid receiver 242.

Figure 11:
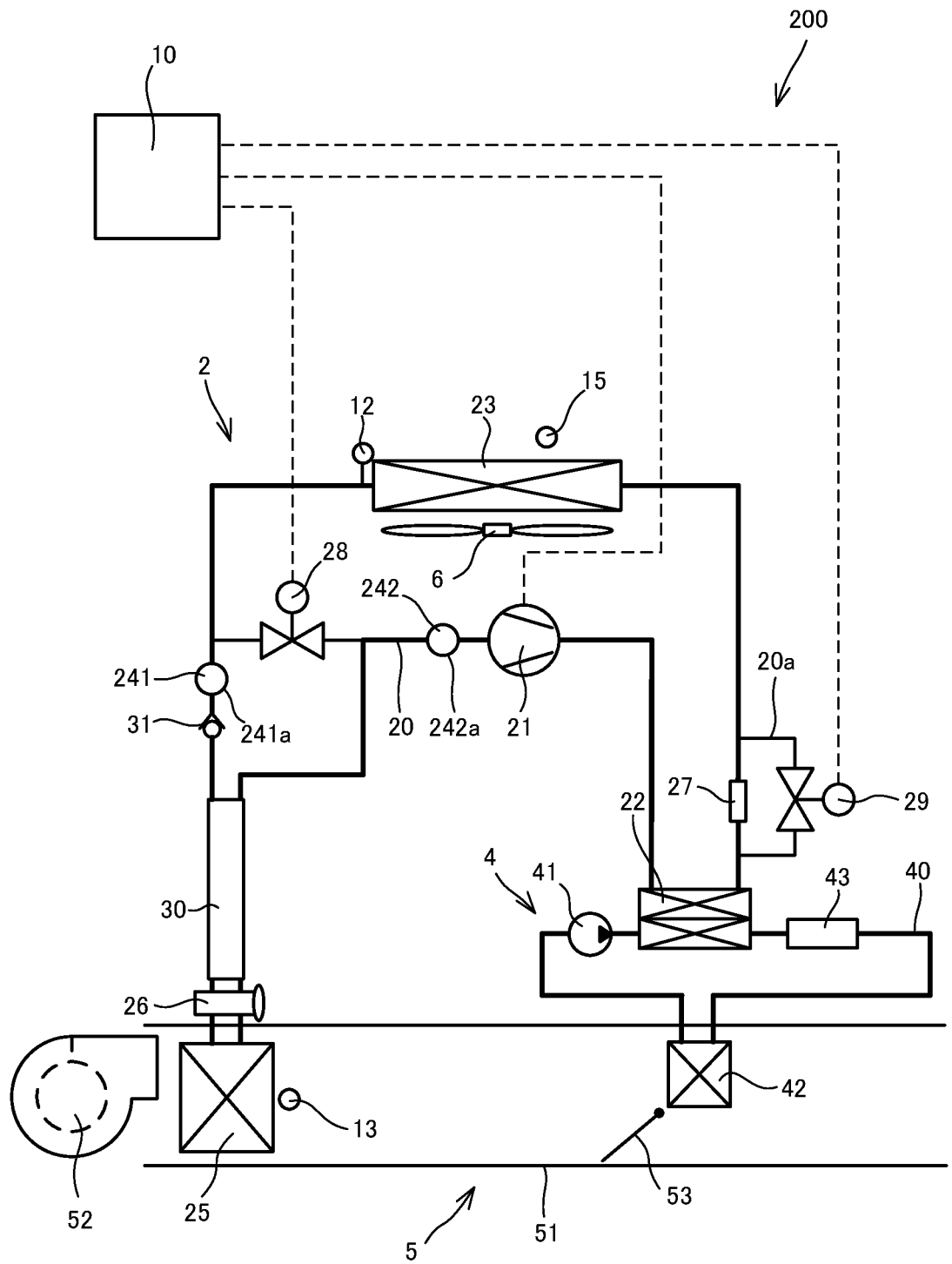
FIG. 11 is a diagram for explaining the flow of the refrigerant of the air-conditioning device in the dehumidifying cabin-heating mode.

As shown in FIG. 11, in the dehumidifying cabin-heating mode, the controller 10 closes the first flow path switching valve 28 and closes the second flow path switching valve 29.

The refrigerant that has become high temperature by being compressed in the compressor 21 flows to the fluid-cooled condenser 22. The refrigerant that has reached the fluid-cooled condenser 22 heats the hot water within the fluid-cooled condenser 22, becomes low temperature by being decompressed and expanded by flowing through the fixed restrictor 27, and flows to the outside heat exchanger 23.

The refrigerant that has reached the outside heat exchanger 23 is subjected to the heat exchange with the outside air introduced to the outside heat exchanger 23, and thereafter, the refrigerant is subjected to the gas/liquid separation in the first liquid receiver 241. Then, the liquid-state refrigerant stored in the first liquid receiver 241 in the cabin-cooling mode and the liquid-state refrigerant separated by the gas/liquid separation in the first liquid receiver 241 flow via the internal heat exchanger 30. In this way, in the dehumidifying cabin-heating mode, the liquid-state refrigerant stored in the first liquid receiver 241 is led to the evaporator 25.

Thereafter, the liquid-state refrigerant is decompressed and expanded by the thermostatic expansion valve 26 and flows into the evaporator 25. While passing through the evaporator 25, the liquid-state refrigerant is evaporated by absorbing the heat of the air to be used for the air-conditioning. The gaseous-state refrigerant that has been obtained by the evaporation in the evaporator 25 passes through the internal heat exchanger 30 and flows again into the compressor 21 via the second liquid receiver 242.

The air flows towards the downstream side of the HVAC unit 5 is used as the dehumidifying cabin-heating wind by being dehumidified by the evaporator 25 and being heated by the heater core 42.

As described above, also in the second embodiment, similarly to the first embodiment, in the dehumidifying cabin-heating mode, the liquid-state refrigerant stored in the first liquid receiver 241 is led to the evaporator 25 while performing the cabin-heating operation. In the cabin-cooling mode, storing the liquid-state refrigerant, which is a part of the refrigerant led from the outside heat exchanger 23, in the first liquid receiver 241 is promoted. Therefore, by temporarily switching to the cabin-cooling mode, the liquid-state refrigerant can be stored in the first liquid receiver 241, and in the dehumidifying cabin-heating mode, it is possible to perform dehumidification using the liquid-state refrigerant in the first liquid receiver 241 while performing the cabin-heating operation. Therefore, it is possible to stably execute the dehumidifying cabin-heating operation which performs dehumidification while maintaining the cabin-heating state.

Although the embodiments of the present invention have been described in the above, the above-mentioned embodiments merely illustrate a part of application examples of the present invention, and the technical scope of the present invention is not intended to be limited to the specific configurations in the above-mentioned embodiments.

The invention claimed is:

1. An air-conditioning device mounted on a vehicle comprising:
   a compressor configured to compress a refrigerant;
   an outside heat exchanger configured to perform heat exchange between the refrigerant and outside air;
   an evaporating unit configured to evaporate the refrigerant by causing the refrigerant to absorb heat of air to be led to a vehicle cabin of the vehicle;
   a heater unit configured to heat the air to be led to the vehicle cabin using heat of the refrigerant compressed by the compressor;
   a liquid receiver arranged at a downstream side of the outside heat exchanger, the liquid receiver being configured to separate the refrigerant led from the outside heat exchanger into a liquid-phase refrigerant and a gaseous-phase refrigerant and to store the liquid-phase refrigerant;
   a restrictor mechanism provided between the heater unit and the outside heat exchanger, the restrictor mechanism being configured to decompress and expand the refrigerant; and
   an expansion valve provided between the outside heat exchanger and the evaporating unit, the expansion valve being configured to decompress and expand the refrigerant that has passed through the outside heat exchanger, wherein
   when there is a dehumidification request, an operation mode is temporarily switched from a first operation mode which evaporates the refrigerant by the evaporating unit and radiates heat by the heater unit in a state in which the restrictor mechanism restricts a flow of the refrigerant, to a second operation mode which evaporates the refrigerant by the evaporating unit in a state in which the restrictor mechanism does not restrict a flow of the refrigerant while promoting a storage of the liquid-phase refrigerant in the liquid receiver.

2. The air-conditioning device according to claim 1, wherein:
   the restrictor mechanism comprises a fixed restrictor and a flow path switching valve configured to switch a flow path of the refrigerant so as to bypass the fixed restrictor,
   in the first operation mode, the flow path switching valve is switched so that the refrigerant passes through the fixed restrictor, and
   in the second operation mode, the flow path switching valve is switched so that the refrigerant bypasses the fixed restrictor.

3. The air-conditioning device according to claim 1, wherein
   the restrictor mechanism is an electrical restrictor mechanism capable of adjusting an opening degree thereof,
   in the first operation mode, the electrical restrictor mechanism is adjusted to restrict the flow of refrigerant, and
   in the second operation mode, the electrical restrictor mechanism is adjusted so as not to restrict the flow of the refrigerant.

4. The air-conditioning device according to claim 1, wherein
   when a temperature of the evaporating unit becomes higher than a set temperature in the first operation mode, the operation mode is switched to the second operation mode.

5. The air-conditioning device according to claim 4, further comprising:
   an evaporating unit temperature detector configured to detect the temperature of the evaporating unit, wherein
   when the temperature detected by the evaporating unit temperature detector becomes higher than the set temperature in the first operation mode, the operation mode is switched to the second operation mode.

6. The air-conditioning device according to claim 4, wherein
   when a state in which the temperature of the evaporating unit is higher than the set temperature continues for a set time period or more in the first operation mode, the operation mode is switched to the second operation mode.

7. The air-conditioning device according to claim 1, further comprising:
an auxiliary heater unit configured to assist heating of the air to be led to the vehicle cabin, wherein
in the second operation mode, the auxiliary heater unit heats air that has passed through the evaporating unit and is led to the vehicle cabin.

8. The air-conditioning device according to claim 7, wherein
the auxiliary heater unit is at least one of an air heater configured to directly heat the air to be led to the vehicle cabin, a hot water heater configured to heat hot water for heating the air to be led to the vehicle cabin, and a hot water heat exchanger configured to heat the air to be led to the vehicle cabin using exhaust heat of an internal combustion engine of the vehicle.

9. The air-conditioning device according to claim 7, wherein
when there is the dehumidification request at a time of starting the air-conditioning device, an operation starts in the second operation mode.

10. The air-conditioning device according to claim 1, wherein
the expansion valve is a thermostatic expansion valve configured to adjust an opening degree depending on a temperature of the refrigerant that has passed through the evaporating unit.

11. The air-conditioning device according to claim 1, further comprising:
an internal heat exchanger configured to perform heat exchange between an upstream refrigerant and a downstream refrigerant of the evaporating unit.

12. The air-conditioning device according to claim 1, wherein in the first operation mode:
the heater unit performs heat exchange between a high-pressure refrigerant discharged from the compressor and the air to be led to the vehicle cabin,
the restrictor mechanism decompresses and expands the refrigerant led out from the heater unit,
the refrigerant, a pressure of which is made intermediate by being decompressed and expanded by the restrictor mechanism, flows into the outside heat exchanger,
the liquid receiver separates the refrigerant led from the outside heat exchanger into the gaseous-phase refrigerant and the liquid-phase refrigerant,
the expansion valve decompresses and expands the liquid-phase refrigerant led from the liquid receiver,
the evaporating unit evaporates the refrigerant by heat exchange between the refrigerant, the pressure of which is made low by being decompressed and expanded by the expansion valve, and the air to be led to the vehicle cabin, and
the gaseous-phase refrigerant is led to the compressor,
whereas in the second operation mode:
the high-pressure refrigerant discharged from the compressor passes through the heater unit,
the high-pressure refrigerant passed through the heater unit flows into the outside heat exchanger,
the liquid receiver separates the refrigerant led from the outside heat exchanger into the gaseous-phase refrigerant and the liquid-phase refrigerant and stores the liquid-phase refrigerant,
the expansion valve decompresses and expands the liquid-phase refrigerant led from the liquid receiver,
the evaporating unit evaporates the refrigerant by heat exchange between the refrigerant, the pressure of which is made low by being decompressed and expanded by the expansion valve and the air to be led to the vehicle cabin, and
the gaseous-phase refrigerant is led to the compressor.

* * * * *